(12) United States Patent
Sarr et al.

(10) Patent No.: US 8,983,825 B2
(45) Date of Patent: Mar. 17, 2015

(54) COLLABORATIVE LANGUAGE TRANSLATION SYSTEM

(76) Inventors: Amadou Sarr, Denver, CO (US); Bonita Louise Griffin Kaake, Lakewood, CO (US); Michael Esposito, Lakewood, CO (US)

( * ) Notice: Subject to any disclaimer, the term of this patent is extended or adjusted under 35 U.S.C. 154(b) by 280 days.

(21) Appl. No.: 13/295,938

(22) Filed: Nov. 14, 2011

(65) Prior Publication Data

US 2013/0124185 A1    May 16, 2013

(51) Int. Cl.
*G06F 17/28* (2006.01)

(52) U.S. Cl.
CPC .................................. *G06F 17/289* (2013.01)
USPC ................... 704/2; 717/136; 714/724; 704/4; 704/3; 704/277; 704/10

(58) Field of Classification Search
CPC .............. G06F 17/289; G06F 17/2827; G06F 17/2836; G06F 17/2872; G06F 17/22; G06F 17/2735; G06N 5/022; G10L 13/043; G10L 13/1822; G10L 13/26; H04L 12/2697; H04L 12/583; H04L 12/5835; H04L 12/50; H04L 12/063; H04L 12/066
USPC .......... 717/136; 714/724; 704/4, 3, 277, 2, 10
See application file for complete search history.

(56) References Cited

U.S. PATENT DOCUMENTS

| | | | |
|---|---|---|---|
| 4,953,088 A | 8/1990 | Suzuki et al. | |
| 5,351,189 A | 9/1994 | Doi et al. | |
| 5,384,701 A | 1/1995 | Stentiford et al. | |
| 6,158,031 A * | 12/2000 | Mack et al. | 714/724 |
| 6,292,769 B1 | 9/2001 | Flanagan et al. | |
| 6,772,413 B2 * | 8/2004 | Kuznetsov | 717/136 |
| 6,782,384 B2 * | 8/2004 | Sloan et al. | 1/1 |
| 6,996,520 B2 * | 2/2006 | Levin | 704/10 |
| 7,020,601 B1 * | 3/2006 | Hummel et al. | 704/2 |
| 7,860,706 B2 * | 12/2010 | Abir | 704/4 |
| 7,865,358 B2 * | 1/2011 | Green et al. | 704/10 |
| 8,145,472 B2 * | 3/2012 | Shore et al. | 704/2 |
| 2003/0176995 A1 * | 9/2003 | Sukehiro | 704/2 |
| 2006/0004560 A1 * | 1/2006 | Whitelock | 704/2 |
| 2006/0106825 A1 * | 5/2006 | Cozzi | 707/100 |
| 2006/0271349 A1 * | 11/2006 | Scanlan | 704/2 |
| 2007/0294076 A1 * | 12/2007 | Shore et al. | 704/2 |
| 2008/0133245 A1 * | 6/2008 | Proulx et al. | 704/277 |
| 2011/0077934 A1 * | 3/2011 | Kanevsky et al. | 704/3 |
| 2014/0337007 A1 * | 11/2014 | Waibel et al. | 704/3 |

* cited by examiner

*Primary Examiner* — Michael Colucci
(74) *Attorney, Agent, or Firm* — Roger A. Jackson

(57) ABSTRACT

A collaborative language translation system, computer readable storage medium, and method is disclosed that allocates as between automated and manual language translation services, wherein a manual language translator creates a unique database including manual translator languages capability, accuracy skill level, scope of translation project desired, and translation turnaround time. Also a client creates a unique information set that includes original language, desired language, scope of translated material, client desired translation formats, client desired translation timing, and client desired translation accuracy. Also included in the system is an automated language translation database and instructions for allocating a flow of the unique information set as between the unique database and the automated language translation database based upon the client unique information set and instructions to perform the selected language translation for the client.

15 Claims, 19 Drawing Sheets

Service Web Service

Service

The following operations are supported.
For a formal definition, please review the Service Description.

- GetMessage
- GetMyMessages
- GetServiceInfo
- GetServiceInfoXML
- GetTranslators
- Login
- SaveSystemClient
- SubmitTranslation CTS Web Translation Gateway WSDL

CTS Client Account Information Screen
125,140

Options

| Translation | My Account |

Account Information

| Account Property | Value |
|---|---|
| Business Name | Smith LLC |
| Your Name | Smith, John |
| Address | jsmith@smith.com |
| City | 10 Elm Street, Suite 200 |
| State | CO |
| Zip | 80226 |
| Phone | 303.271.1131 |
| Payment Type | PayPal |
| Payment Info | SMITHPAYPALID |

Cancel  OK

```
┌─────────────────────────────────────────────────────────────┐
│ Member Account                               _ □ X         │
│ CTS Web Site Member Login                                   │
│ File  Edit  View  Favorites  Tools  Help                    │
│ Address: http://localhost/CTS/member/           ˅  Go       │
│                                                             │
│ Member Account ──80,85                                      │
│ ┌─────────────────────────┐  ┌──────────────────────────┐  │
│ │ Account Summary         │  │ Account Tools            │  │
│ │                   ─120  │  │                          │  │
│ │ John Tran               │  │ Edit Your Personal Information │
│ │ Email/User Name: jtran@test.com │ Edit Your Security Information │
│ │ Membership Type: (ongoing) │ │ Unsubscribe            │  │
│ └─────────────────────────┘  └──────────────────────────┘  │
│                                                             │
│ ┌─────────────────────────┐                                 │
│ │ Subscription Information│                                 │
│ │                         │                                 │
│ │ You are currently a member │                              │
│ └─────────────────────────┘                                 │
│                                                             │
│ ┌─────────────────────────────────────────────────────┐    │
│ │ Translations                                         │ 95, │
│ │                                                      │ 100,│
│ │ Current credit balance: $3.00                        │ 105,│
│ │ View/Withdraw Your Pending Translation Credits       │ 110,│
│ │ View Your Payment History                            │ 115 │
│ │ Message Queue                                        │    │
│ │ Member Languages, Technical Lexicon, Scope, Turnaround Time, and Ranking │
│ │ Member Payment                                       │    │
│ └─────────────────────────────────────────────────────┘    │
│                                                  ◁ 70,75   │
└─────────────────────────────────────────────────────────────┘
```

Message Queue

File | Edit | View | Favorites | Tools | Help

Address: http://localhost/CTS/member/queue.aspx  → Go

Member Queue ~80,85

| | Create Date | Language Pair | Status | Message Text | Translated Text | Translator Name | System Name |
|---|---|---|---|---|---|---|---|
| Edit | 5/9/10 8:33 PM | English to German | OPEN | I am from Munich | ... | | CTS Client Demo System 1 |
| Edit | 5/9/10 8:32 PM | English to German | OPEN | I am from Munich | ... | | CTS Client Demo System 1 |
| View | 3/2/10 3:19 PM | English to Italian | CLOSED | I am from Rome | Sona di Roma | translator@test.com | CTS Client Demo System 1 |
| View | 3/2/10 2:14 PM | English to Italian | CLOSED | I am from Rome | Sona di Roma | ROBOT | CTS Client Demo System 1 |

Message Queue

File | Edit | View | Favorites | Tools | Help

Address: http://localhost/CTS/general/queue.aspx | Go

General Queue ~80,85

| | Create Date | Language Pair | Status | Message Text | Translated Text | Translator Name | System Name |
|---|---|---|---|---|---|---|---|
| Edit | 5/9/10 8:33 PM | English to German | OPEN | I am from Munich | ... | | CTS Client Demo System 1 |
| Edit | 5/9/10 8:32 PM | English to German | OPEN | I am from Munich | ... | | CTS Client Demo System 1 |
| View | 3/2/10 3:19 PM | English to Italian | CLOSED | I am from Rome | | | CTS Client Demo System 1 |
| View | 3/2/10 2:14 PM | English to Italian | CLOSED | I am from Rome | | | CTS Client Demo System 1 |

Member/Translator Payment History

Member Payment Details

| File | Edit | View | Favorites | Tools | Help |

Address: http://localhost/CTS/member/MemberPaymentDetails.aspx?mode=HIST  Go jtran@test.com | My Home | Logout Member Payment Details — 80,85

Closed Payments

Paid To Date: $11.25

| Message ID | Amt. | Create Date | Translated Date | Language Pair | Message Text | System Name | Payment Date | Transaction ID | Payment Type |
|---|---|---|---|---|---|---|---|---|---|
| View | 0.75 | 10/17 | 10/17/10 | English To German | With them went.... | CTS Demo System 1 | 10/17 | cb62fba | PayPal |
| View | | | | | | | | | |
| | | | | | | | | | |

Fig. 18

Member/Translator Rankings

```
File  Edit  View  Favorites  Tools  Help
Address: http://localhost/CTS/member/MemberLang.aspx    ▼  Go
                                    jtran@test.com | My Home | Logout
```
— 75
— 120

Member Languages & Ranking —— 80, 85

Overall Ranking

| Accuracy: | 2 |
|---|---|
| Speed: | 2 |
| Cost: | 2 |

Languages

| Language Pair | Rankings | |
|---|---|---|
| EnglishToGerman | Accuracy: | 2 |
| | Speed: | 2 |
| | Cost: | 2 |
| EnglishToItalian | Accuracy: | 3 |
| | Speed: | 3 |
| | Cost: | 3 |

COLLABORATIVE LANGUAGE TRANSLATION SYSTEM

TECHNICAL FIELD

The present invention generally relates to a system for language translation. More particularly, the present invention is an on-line based collaborative translation system, termed (CTS) that is a web based product that offers real-time and batch translation services to clients over the internet. The CTS is protocol agnostic, meaning it can provide its services via all the major internet protocol and data types, with the CTS helping to solve the issues raised by inaccuracies of current automated translation software products by providing a real time system by which skilled human agents may translate all or part of the client communications.

BACKGROUND OF INVENTION

The need for language translation has existed ever since there was the desire for communication as between different ethnic groups. Typically a local in person translator was used to translate either a live conversation on-the-fly or would translate text to text from one language to another language. The accuracy of this method depended greatly upon the skill and knowledge of the particular translator, as with many language translations, there is not a word for word correlation, thus the translator must translate thoughts, concepts, and ideas in conveying from the original language into the new language, therein lies the problem with automated software language systems—wherein the automated translation system puts forth some form of automated logic on a word for word basis, thus increasing the opportunity for error in the language translation. This of course leaves the opportunity for misinterpretation or lack of understanding in the translation, this can be especially troublesome when the translation work involves highly technical, scientific, or some specialized lexicon data in the language to be translated that either the automated language software has no automated logic for, resulting in an even higher number of errors, or the particular human manual translator may not be familiar with, in other words a translator may know several languages well, however, the translator may not be familiar with a specialized vocabulary applicable to a specific technical field which increases the opportunity for translation errors even when the language translation is done manually. As examples, for specialized lexicons in the legal, medical, scientific, technical, and similar fields are especially troublesome to get an accurate language translation easily, as the automated language translation software would be prone to a large number of errors and for the human manual language translator—they may not have the right skills to complete the desired language translation in a specialized lexicon with any degree of accuracy.

There are been numerous attempts to automate translation through software, which is very attractive for completing a high number of translations quickly and at low cost, however, due to the problems mentioned above of specialized terminology, i.e. the lexicon not being easily translated in an accurate manner, with automated translation this specialized terminology/accuracy problem is made even worse as the translation data bases currently have a hard time of interpreting context of the translated idea or thought, as by necessity the translation databases must use set logic which can work acceptably well in simple basic conversation type words to be translated, however, any translation being beyond this and moving toward a technical or specialized nature, the error rate in automated translation would be too high to be acceptable.

In looking at the prior art in the language translation area starting with U.S. Pat. No. 6,292,769 to Flanagan et al. disclosed is a system for the automated translation of speech having speech recognition software as input for spoken words in online chat or conferencing systems. Thus in Flanagan et al., users may speak rather than type their messages and hear comments from other users. The speech data in Flanagan et al., is translated into textual data and submitted to the online information service or computer network for processing, see. column 2, lines 20-22 and lines 27-31.

Continuing in the prior art translation area in U.S. Pat. No. 5,351,189 to Doi et al. disclosed is a machine translation system including separated side-by-side display of original and corresponding translated sentences, wherein scrolling can be done to roll through the side-by-side display of original and translated segments. The machine translation system in Doi et al., comprises a translation processor for translating an original sentence by accessing a dictionary to produce a translated sentence corresponding to the original sentence, see column 2, lines 34-39.

Next, in the language translation prior art area in U.S. Pat. No. 6,996,520 to Levin disclosed is a language translation system of electronic communications that automatically selects and deploys specialized dictionaries based upon context recognition and other factors. The system in Levin includes a machine translation component which can access a database of specialized dictionaries and deploy search agents to search the internet for complementary specialized translation dictionaries, see column 3, lines 21-28. Also, in the translation arts in U.S. Pat. No. 5,384,701 to Stentiford et al., disclosed is a language translation system for translating phrases from a first language into a second language comprising a store holding collections of phrases in the second language. Phrases input in Stentiford et al., are characterized on the basis of keywords, and the corresponding phrases in the second language are output in an effort to increase speed and accuracy of automated translation. Thus in Stentiford et al., being similar to the typical tourist language translation "phrase book" of commonly used phrases such as "where is the bathroom" or "how much does this cost" as being more useful for typical conversation than a word for word translation when trying to communicate with someone in a different language—thus reinforcing the idea that in language translation it requires an "interpretation" of the meaning of a group of words to a similar meaning in the translated language, lending emphasis to the problem of either the automated language software translator or the manual human translator capacity to do this word group "interpretation" into the new language.

Further to this in the language translation arts, in U.S. Pat. No. 4,953,088 to Suzuki et al. disclosed is a sentence translator with processing stage indicator. The translation apparatus in Suzuki et al., has a computer which analyzes the original language sentence and generates a target language sentence based on the analyzed original language sentence. Suzuki et al., attempts to refine the word-to-word automated translation scheme by ascertaining the translated word criterion of its verb, noun, adverb, adjective, plural, singular, tense, person, and the like, associated with the looked up words to translate, by further using a comparison to perform a syntactic (criterion relationship), semantic (coordination of criterion), and context (expression theme of the criterion) analysis for determining a best fit scenario relationship as between the translated words criterion, while indicating the continual status of the translation. Thus in Suzuki et al., there is an attempt to further refine the logic of the language translation software to improve the translation accuracy, and as this may be done for commonly used conversational words in major languages, there would not be much motivation to refine the language translation logic to this degree in uncommon specialized technical lexicons due to the smaller need for these language translations, thus the automated language software translation inaccuracy would still exist for specialized technical lexicon language translations.

There exists a need to provide an internet based language translation system that attempts to combine the best of both worlds being the automated software language translation systems and the skilled human manual language translation in a central system that can allocate as between automated and manual language translation to best fulfill the particular translation needs of the translation client. The ideal internet based language translation system would avail itself of a multitude of both automated software language systems and a multitude of skilled manual human language translators, thus resulting in optimizing the accuracy of the language translation by pulling together as many ways of accomplishing language translation as possible—to best serve the languages involved and the potential specialized nature of the lexicon involved. This could be accomplished via a password protected basic web-site to show some information about the Collaborative Translation System (CTS) system, its usage and links and other resources for identifying the product's core functionality, such as maintaining a list of translator logins. A further aspect in the CTS system is the translation console that is a major component of the system. The CTS system console demonstrates the translator and translator administrator experience to monitor and translate messages, by having two modes: A first translator mode: having translator login, translator skill set-termed settings, shows the experience for the translator of receiving messages from the queue, translating them and sending them back, and cumulative data on the particular translator performance. A second administrator mode would include: administrator login, CTS system overall operational statistics, and particular translation case statistics.

SUMMARY OF THE INVENTION

A collaborative language translation system is disclosed that allocates as between automated and manual language translation services, with the collaborative language translation system including a credential protected language translation data portal for a manual language translator to gain access to a manual language translator section. Further included in the system is a unique database associated with the manual language translator in the manual language translator section, the unique database includes information selected from the group consisting essentially of manual language translator specific languages capability for translation, accuracy skill level for each language translated, scope of language translation project desired, and language translation turnaround time availability. In addition included in the system is a credential protected language translation portal for a language translation client to gain access to a language translation client section, wherein the language translation client initiates a selected language translation to be completed.

Further the system includes a unique information set associated with the language translation client in the language translation client section, the unique information set includes information selected from the group consisting essentially of client original language, client desired language, scope of translated material, client desired translation formats, client desired translation timing, and client desired translation accuracy that are associated with the selected language translation to be completed. Also included in the system is an automated language translation database, one or more processors, a memory, and one or more programs, wherein the one or more programs are stored in the memory and configured to be executed by the one or more processors. The one or more programs including instructions for allocating a flow of the unique information set as between the unique database and the automated language translation database based upon the client initiated unique information set associated with the selected language translation to be completed and instructions to perform the selected language translation to be completed for the language translation client.

BRIEF DESCRIPTION OF DRAWINGS

FIG. 5 shows a screenshot of the CTS web translation gateway which includes the service description, get message, get my messages, get service info, get service info XML, get translators, login, save system client, and submit translation;

FIG. 7 shows a CTS client account information screenshot that includes account property, business name, name, address, city, state, zip-code, phone, payment type, and payment info;

FIG. 13 shows a screenshot of the member account information that includes an account summary with name, email, membership type, subscription information on membership, translation statistics with credit balance, pending translations, payment history, message queue, member languages, and member payment, also the account tools of editing personal and security information, and an unsubscribe option;

FIG. 15 shows a further subsequent screenshot after the translator or member has logged in and opened their own personal queue that displays their pending translation jobs, that includes information such as opening day create date, language pair translation, current status, a sampling of message text is sampling of translated text, member ID, and system name;

FIG. 16 shows a subsequent screenshot after the translator or member has logged in and opened the general queue that displays all generally available pending translation jobs, that includes information such as opening day create date, language pair translation, current status, a sampling of message text, and system name;

FIG. 17 shows a screenshot of the member working page including translator ID, home, message queue, and logout, with the message text to be translated, the language pair desired, and the box for entering translated text;

FIG. 18 shows a screenshot of the member translation job closed payments page including translator ID, home, and logout, with the paid to date balance shown, and table showing the pending and completed translation jobs that has the message ID, amount, create date, translated date, language pair, message text, system name, payment date, transaction ID, and payment type; and FIG. 19 shows a screenshot of the member translator rankings page including translator ID, home, and logout, with an overall ranking box including accuracy, speed, and cost, along with another box for language pair rankings that also include accuracy, speed, and cost.

REFERENCE NUMBERS IN DRAWINGS

Figure 1:
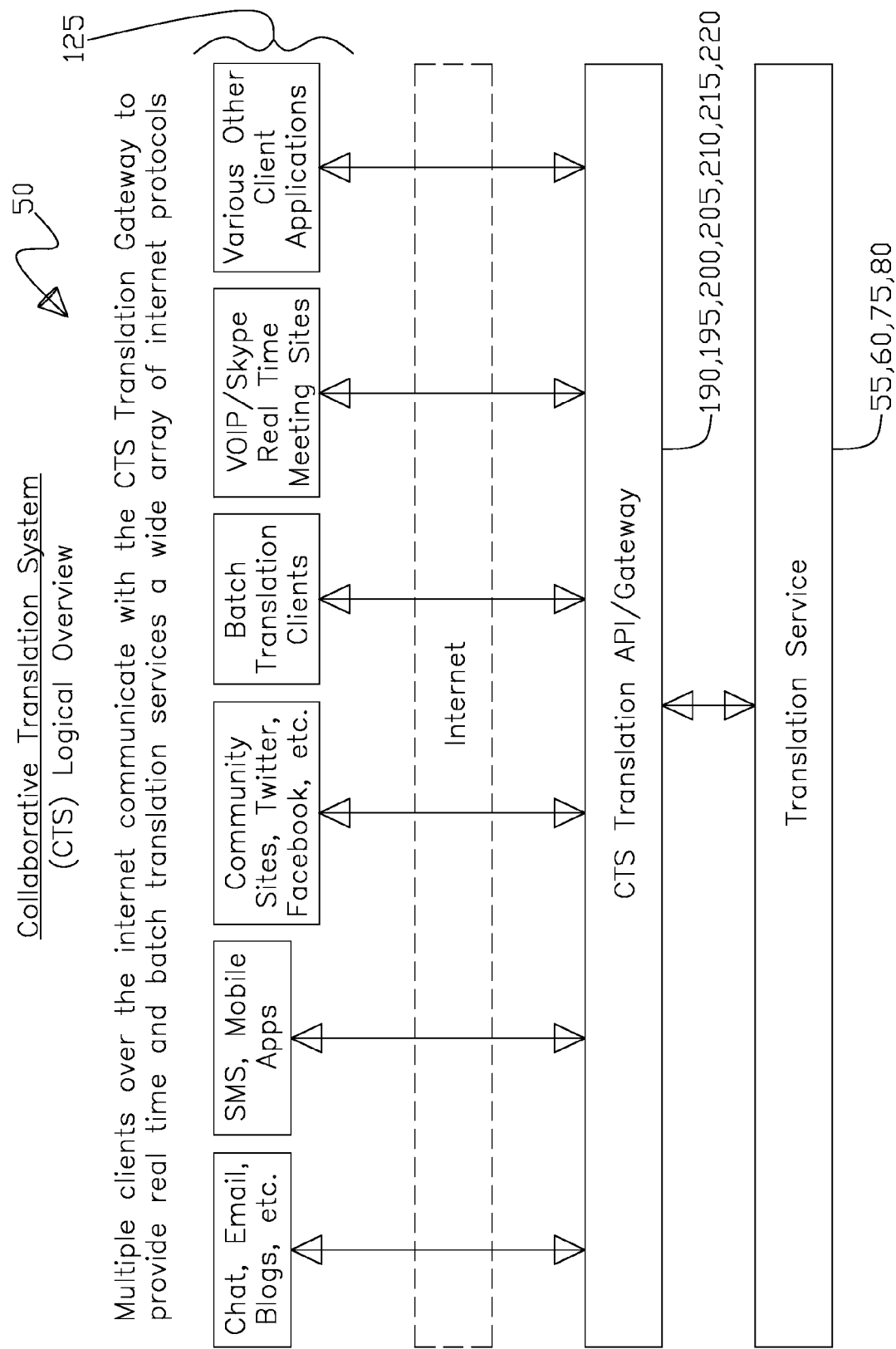
FIG. 1 shows a flowchart of the collaborative translation system (CTS) being the logical overview, starting with a base of the translation service that interfaces with the collaborative translation system translation application programming interface (API) and gateway which then subsequently interfaces with the Internet, then diffusing into specific users of the collaborative translation system, that can include for the client systems requiring translation services such as chat, e-mail logs, and the like, short message service (SMS), including various mobile device applications, social networking sites such as Twitter, Facebook, and the like, batch translation clients, real-time meeting sites such as Skype, the VOIP, and the like, and other various client applications.

50 Collaborative language translation system (CTS)
55 Automated language translation system or termed robot
60 Automated language translation database
65 Automated language translation database 60 parameters of accuracy, speed, and cost
70 Credential protected language translation data portal
75 Manual language translation services
80 Manual language translator or termed member language translator
85 Member language translator 80 section
90 Member language translator 80 unique database
95 Member language translator 80 languages capability
100 Member language translator 80 accuracy skill level for language translation
105 Member language translator 80 scope of language translation project desired
110 Member language translator 80 turnaround time capability for the language translation project
115 Member language translator 80 technical language lexicon expertise skill set
120 Member language translator 80 unique individual identifier
121 Member language translator 80 specific queue of client user 125 language translation jobs
122 Member language translator 80 general queue of client user 125 language translation jobs
125 Client user needing language translation
130 Client user 125 interface login-credential protected language translation portal
135 Client user 125 language translation section
140 Client user 125 unique information set associated with the language client
145 Client user 125 original language text
150 Client user 125 desired language (original language to desired language termed the language pair)
155 Client user 125 scope of language translated material
160 Client user 125 desired language translation format
165 Client user 125 desired language translation timing
170 Client user 125 desired language translation accuracy
171 Client user 125 desired language translation cost
175 Client user 125 technical language lexicon expertise skill set required
180 Client user 125 generated member language translator 80 ranking on categories of accuracy, speed, and cost for language translation 185 Client user 125 desired specific member language translator 80
186 Client user 125 selected member language translator 80 by accuracy, speed, cost, and technical language lexicon 175
190 Processors
195 Memory
200 Programs
205 Allocating a flow of said unique information set as between the unique database 90 and the automated language translation database 60
210 Allocation instructions to firstly go to the automated language translation database 60 if qualified
215 Allocation instructions to secondly go to a member manual language translator 80 specific queue 121 if qualified
220 Allocation instructions to thirdly go to a general queue 122 for the member manual language translator 80 to selectively translate

TERM DEFINITIONS

The collaborative translation system 50 (CTS) includes various software components that work together in the translation process. Described below is an example of a pathway for text language translation through the CTS system.

Business Objects Translation Queue 205;

This is the code that actually makes a decision on how to manage the multiple member language translator 80 work queue 121, 122 and assign messages for translation—or could be termed an algorithm 205 for allocating the flow of the unique information set 140 (from the client 125) as between the unique database 90 (based on the translator member 80) or multiple unique databases 90 (based upon multiple language translator members 80) and the automated language translation database 60 (from the robot) or multiple automated language translation databases 60 (from multiple robots).

CTS Client 125;

Is the actual requester for the language translation services.

Web 70;

This is the actual member translator 80 service website. In addition to basic membership services for the member translator 80 it provides tools that are required to view translations in either the translators 80 specific work queue 121 or general work queue 122 to enable translation of text and documents for clients 125.

CTS Web Service;

This is a web-based asynchronous service oriented component of the system 50. It is the main interface 130 that the client 125 connects to submit text to be translated.

CTS Robot;

This is the automatic translator component 55, 60 of the system 50. Depending upon client 125 requirements in the availability of member translators 80, the robot may be used before the language translation.

DETAILED DESCRIPTION

The Collaborative Translation System (CTS) is a web based product that offers real-time and batch translation services to clients over the World Wide Web. It is protocol agnostic, meaning it can provide its services via all the major internet protocol and data types. It solves the issues raised by inaccuracies of language translation software products by providing a real time system by which human agents may translate all or part of the client messages as desired.

The human member agents are provided with a web-based support system and software in which they may provide translations according to their own schedule. When logged in—they may translate messages as sent to them and are paid according to their speed, proficiency, and quantity of translation. In this way, the goal is to offer a service to entice multi-lingual people world-wide to join the CTS translation community and make money for translating content in batch and real time—as a way to better organize the benefit of "crowd sourcing" on a world-wide geographical basis in utilizing the internet, in the language translation field. In turn, this large confederation of the translators provides the core translation services that would be disseminated via the internet to any kind of product or service that requires language translation.

Logical Overview

FIG. 1 shows a flowchart of the collaborative translation system 50 (CTS) being the logical overview, starting with a base of the translation service that interfaces with the collaborative translation system translation application programming interface (API) and gateway which then subsequently interfaces with the Internet, then diffusing into specific users 80 or 125 of the collaborative translation system 50. That can include in FIG. 1 for the client user 125 systems requiring translation services such as chat e-mail logs, and the like, short message service (SMS), including various mobile device applications, social networking sites such as Twitter, Facebook, and the like, batch translation clients, real-time meeting sites such as Skype, the VOIP, and the like, and other various client applications.

Further, in more detail clients are the users of the translation services. Essentially anyone who uses translation services today is a potential client. In addition, the real-time, internet based and agnostic data and protocol support of the system will enable new markets of customers.

Potential clients include:
  Chat providers (i.e. MSN, AOL etc.)
  Blog Providers (i.e. Word Press, Google Blog etc,)
  SMS Systems
  Cell phone/iPhone/Android/Black berry and other mobile apps
  Community Sites and Services (I.e. Twitter, Facebook, Linked In, etc.)
  Business or Individuals needing document translation. These clients can take advantage of the systems batch translation services (i.e. non-real time translation of large documents)
  Meeting sites such as Gotomeeting.com and WebEx.com
  VOIP providers such as SKYPE and Vonage.
  Email providers such as MSN, Google, Yahoo, etc.

Continuing in FIG. 1, The translation API/Gateway is the external interface that clients of the system use to enable their web-based product or service with language translation, the API/Gateway has the following preferred features;
  a) Works over the internet.
  b) Can accept/return document to translate.
  c) Can accept/return sentence to translate.
  d) Can accept/return audio video/stream to translate.
  e) Can accept/return VOIP data to translate.
  f) In general should support or many different data types and protocols for data to translate.
  g) Basic Request/Response processing (i.e. Web Service)
  h) Can work in batch mode or real time.
  i) For batch mode and document delivery—can support an Inbox/Outbox contrivance.
  j) Accepts priority on translate call (i.e. gold users may have a higher priority)

k) Secure (via HTTPS)

l) API Clients receive API Key for its use. (This is the same model used by PayPal)

Further, in FIG. 1 the translation service is the system that actually provides the translation content and processing disseminated via the API and gateway. It provides all the components that support the collaborative (or Web 2.0) nature of the system. At its core it provides batch or real-time translation services via a managed message queue and multiple live translators to facilitate language translation. The translation service can be broken down further into the components of FIG. 2 as follows.

Figure 2:
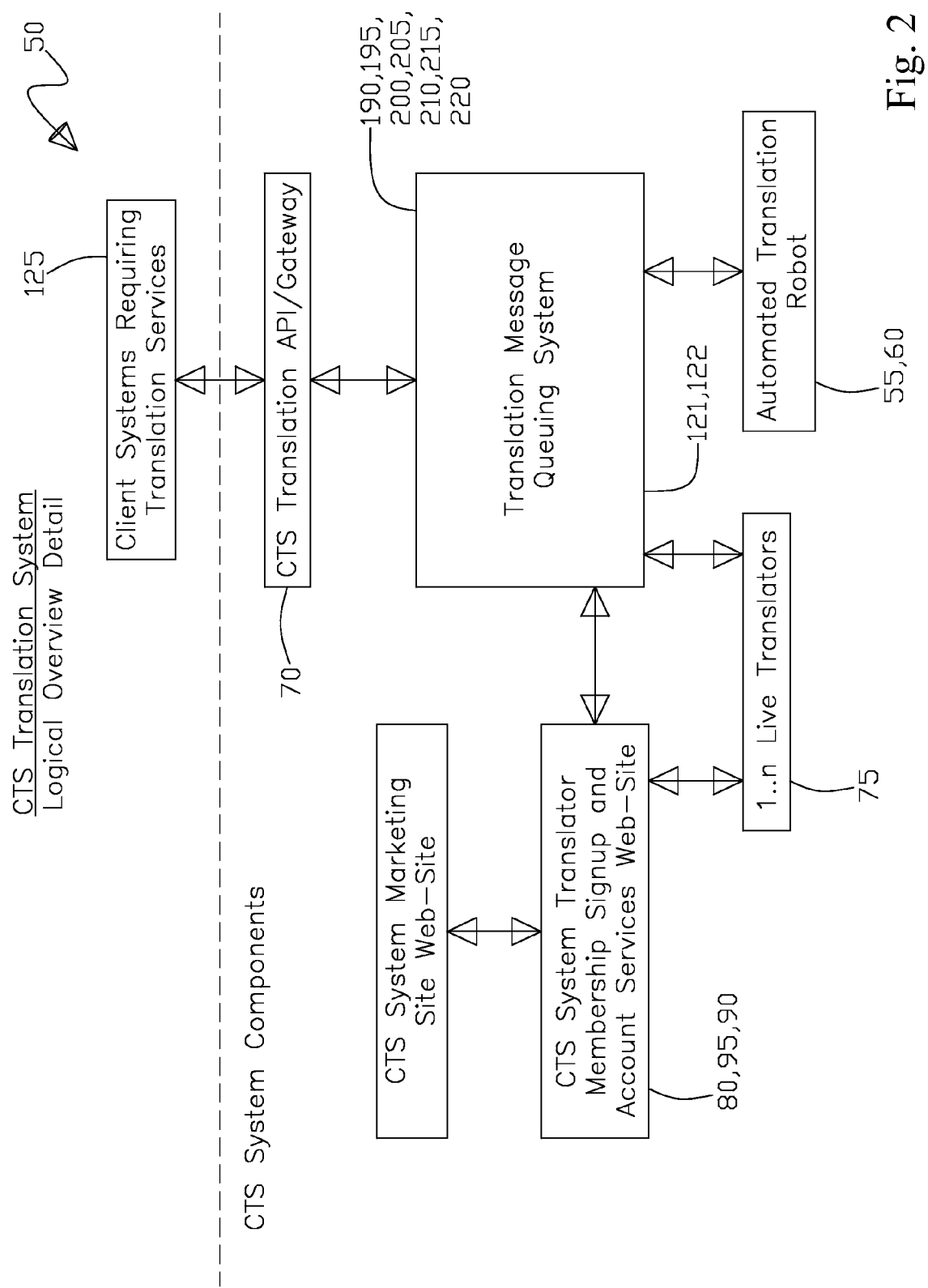
FIG. 2 shows a flowchart of the collaborative translation system portion from FIG. 1 in more detail being the collaborative translation system translation application programming interface (API) that includes the CTS system marketing website, the CTS system translator membership sign up and account services website, the translation messaging and queuing system that interfaces with the CTS system translator, the live translators, and the automated translation robot, wherein the translation message queuing system interfaces with the CTS translation (API) and gateway which in turn interfaces with all the client systems requiring translation services.

Continuing, in FIG. 2 shown is a flowchart of the collaborative translation system 50 portion from FIG. 1 in more detail being the collaborative translation system translation application programming interface 70 (API) that includes the CTS system marketing website, the CTS system translator membership 80 sign up and account services 85 website, the translation messaging and queuing system 121, 122 that interfaces with the CTS system translator, the live manual member translators 80, and the automated translation robot 55 with database 60, wherein the translation message queuing system 205 interfaces with the CTS translation (API) and gateway 70 which in turn interfaces with all the client user 125 systems requiring translation services.

Further, in FIG. 2 the translation service/queue message system is the component of software that receives translation requests from the CTS translation API/gateway and facilitates the translation via the pool of available human 80 (or robot) 55 translators.

A. Supports translation message language pair 150.

B. Finds best available human translator 80 to service message. Search based on language pair, translator ability and preferences.

C. Can send message to robot translator 60 if no human 80 can be found.

D. Robot translator 60 is a version of the pure software translation engines available (i.e. SysTran etc.).

E. In general, the service behaves a First In First Out (FIFO) queue. However, messages may be set with a priority to circumvent the queue.

F. Messages may have characteristics such as:
   a. Real time translation (i.e. chat, VOIP)
   b. Batch mode (i.e. documents)
   c. Desired translator rating
   d. Use same translator for batch of real time messages
   e. Input format (i.e. text, audio, video)
   f. Output format (i.e. text, audio, video)
   g. Priority G. Keeps log of translation data and speed by which translation occurred. Data is used to rate or rank translators 80, provide payment to translators 80, ratings on their services, report on system usage and the like.

H. Supports word and content filter to prevent misuse of the translation services.

Also, in FIG. 2, The translation member 80 marketing web-site is where translators 80 are recruited, tested, trained and supported and ultimately given the tools to provide the translation services.

A. Members 80 may sign up to participate in the service.

B. Members 80 may be tested on their language proficiency.

C. Legal Non-disclosure documents must be electronically signed by the translator 80

D. Members 80 may set how they want to be paid (i.e. Direct Deposit, PayPal, etc.)

E. System may approve members 80 in real-time or provide some background analysis (i.e. human scoring of a translation test, check background info, etc). Once members 80 are approved they may participate in the translation services.

F. The system should strive to be as self servicing and automated as possible reducing most overhead in managing and paying translators 80 to automatic on-line and back office processes.

G. Member 80 knowledge base and support tools.

H. Members 80 take may take proficiency tests in a language at any time. The higher the proficiency the more the translator 80 can get paid for translations.

I. Approved members 80 get access to the translation member web-site. Messages come thru in real time and can be replied to in real time.

J. Batch messages may also come thru

K. The translation member 80 web-site provides access to the translation service queue described above.

L. Administrative and management functionality also provided to administrators.
   a. Translator 80 activity log
   b. Real time translation activity
   c. Manage account info
   d. Basic Web-site management tools.
   e. Financial and System reporting M. Along with the web-site administrative functionality, back office systems such as QuickBooks, GreatPlains, SQL Server Reporting services would provide their own management and reporting functionality.

Figure 3:
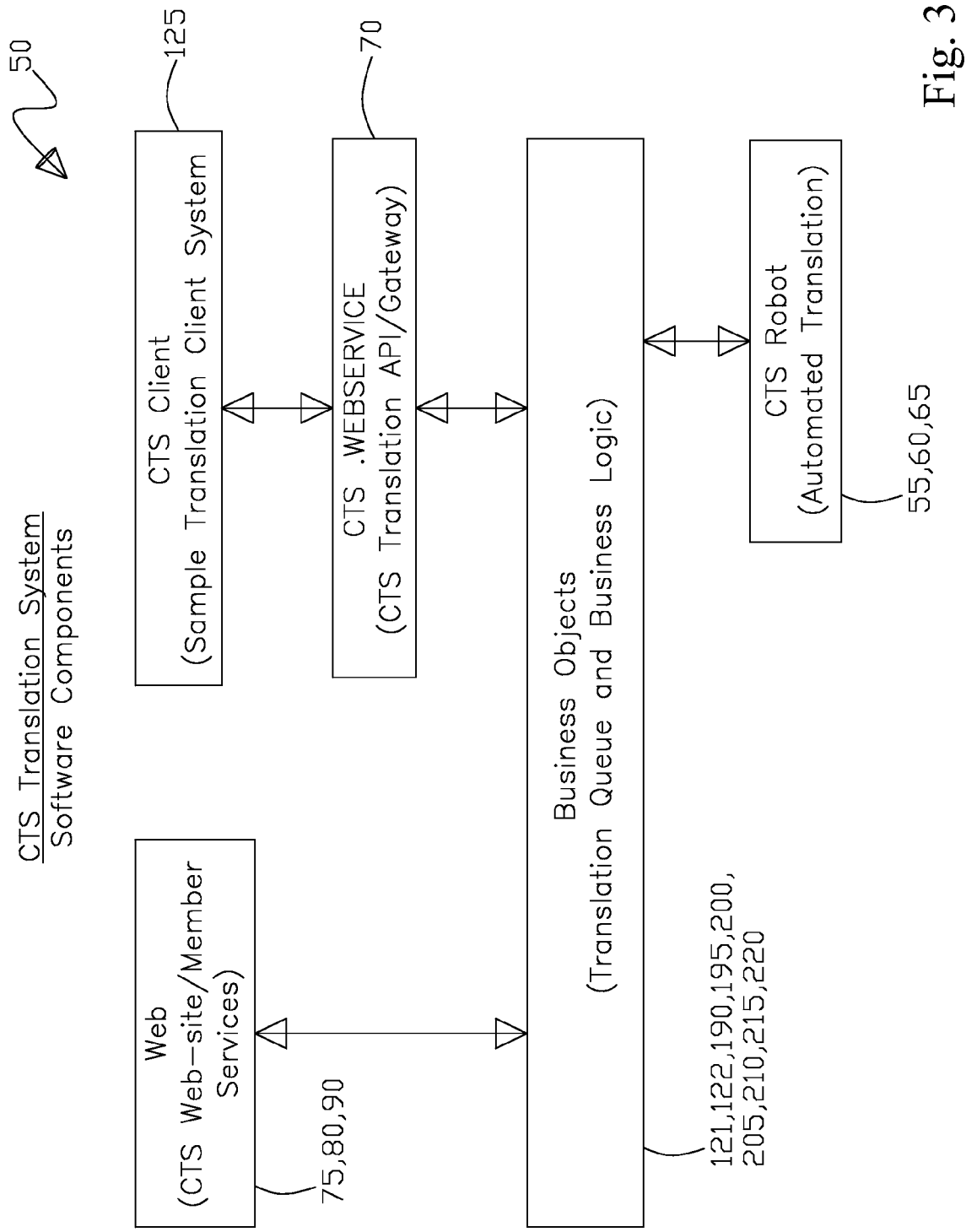
FIG. 3 shows a flowchart of the CTS translation system software components that include the member services CTS Web service that has system tools for the member language translators to view the translation projects in their work order queue and to translate text and documents for the CTS client, wherein the CTS Web service interfaces with the Business Objects which is the application logic of the CTS system that controls and manages all aspects of the member translation queue, assignments, and tracking, wherein the business objects interfaces with the CTS robot being the automatic translator component of the CTS system which is selectively employed depending upon translation complexity and live translator availability, further the Business Objects interfaces with the CTS Web service which is the interface with the CTS client systems wherein client users connect to submit text to be translated in pickup their translated text jobs.

Next, FIG. 3 shows a flowchart of the CTS translation system 50 software components that include the member services CTS Web service 70 that has system tools for the member language translators 80 to view the translation projects in their work order queue 121 or general word order queue 122 and to translate text and documents for the CTS client 125. Wherein the CTS Web service interfaces with the Business Objects which is the application logic 205 of the CTS system 50 that controls and manages all aspects of the member translation queue 121 and general queue 122, assignments, and tracking, wherein the business objects interfaces with the CTS robot 55, 60 being the automatic translator component of the CTS system 50 which is selectively employed depending upon translation complexity and live translator 80 availability. Further, the Business Objects interfaces with the CTS Web service 70 which is the interface with the CTS client systems wherein client users 125 connect to submit text to be translated and pickup translated text for their particular jobs.

Figure 4:
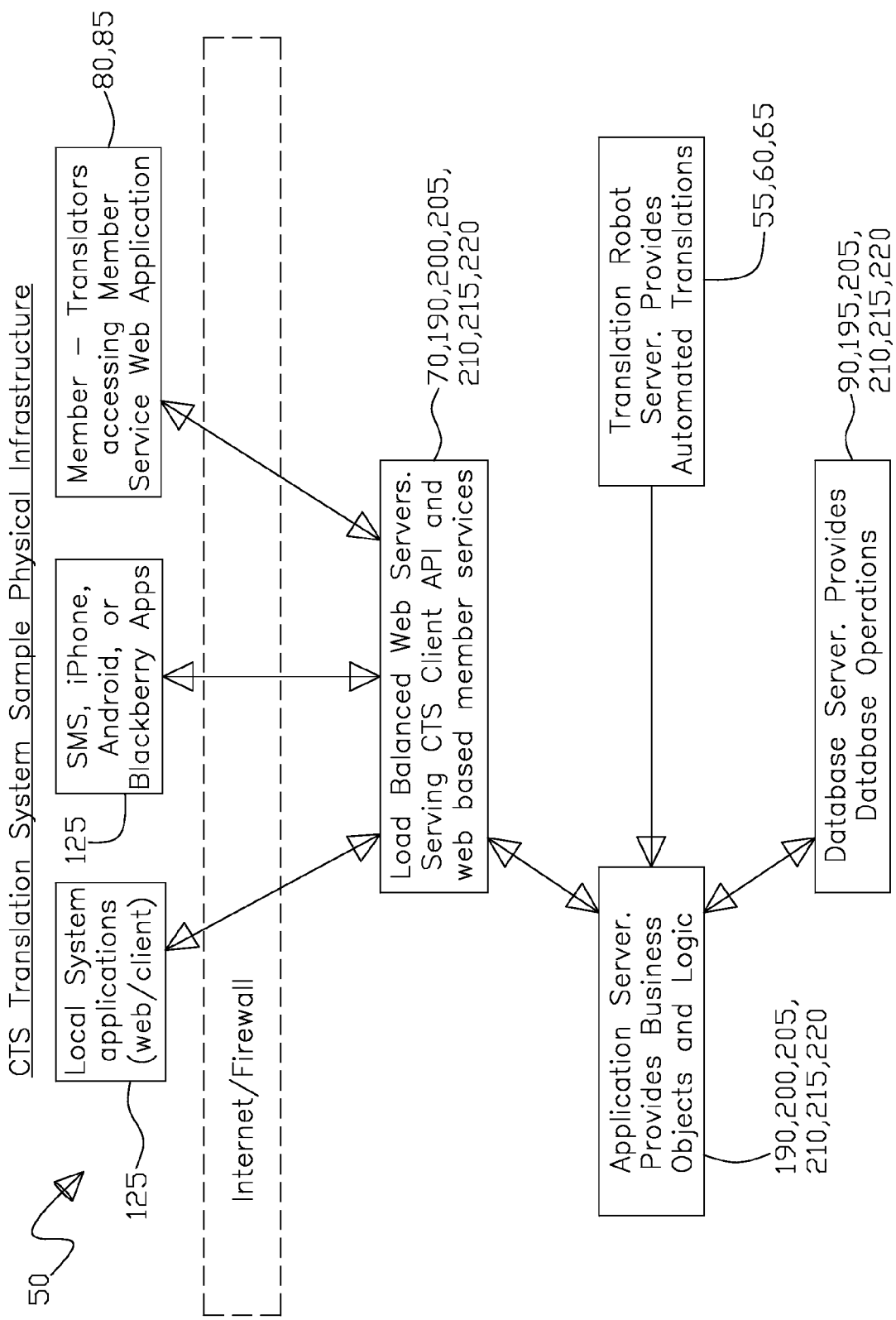
FIG. 4 shows the CTS translation system sample physical infrastructure that can be an n-tier application consisting of the client user interface that can include local system applications through the web site, portable devices through a portable device website, and member translators accessing the member services Web application wherein these three subsystems being the client interface, the portable device interface, and the member interface, all interface with Web servers that serve the CTS client API, and web-based member services wherein the Web servers interface with the application server that provides business objects and logic application server interfaces, with both the translation robot server that provides automated translations and the application server interfaces with the database server.

Further, FIG. 4 shows the CTS translation system 50 sample physical infrastructure that can be an n-tier application consisting of the client user 125 interface 70 that can include local system applications through the web site 70, portable devices through a portable device website 70, and member language translators 80 accessing the member services Web application 70 wherein these three subsystems being the client interface 70, the portable device interface 70, and the member interface 70, all interface with Web servers that serve the CTS client 125 API, and web-based member services. Wherein the Web servers interface with the application server that provides business objects and logic application server interfaces 205, with both the translation robot server 55, 60 that provides automated translations and the application server interfaces with the database server 195.

Figure 6:
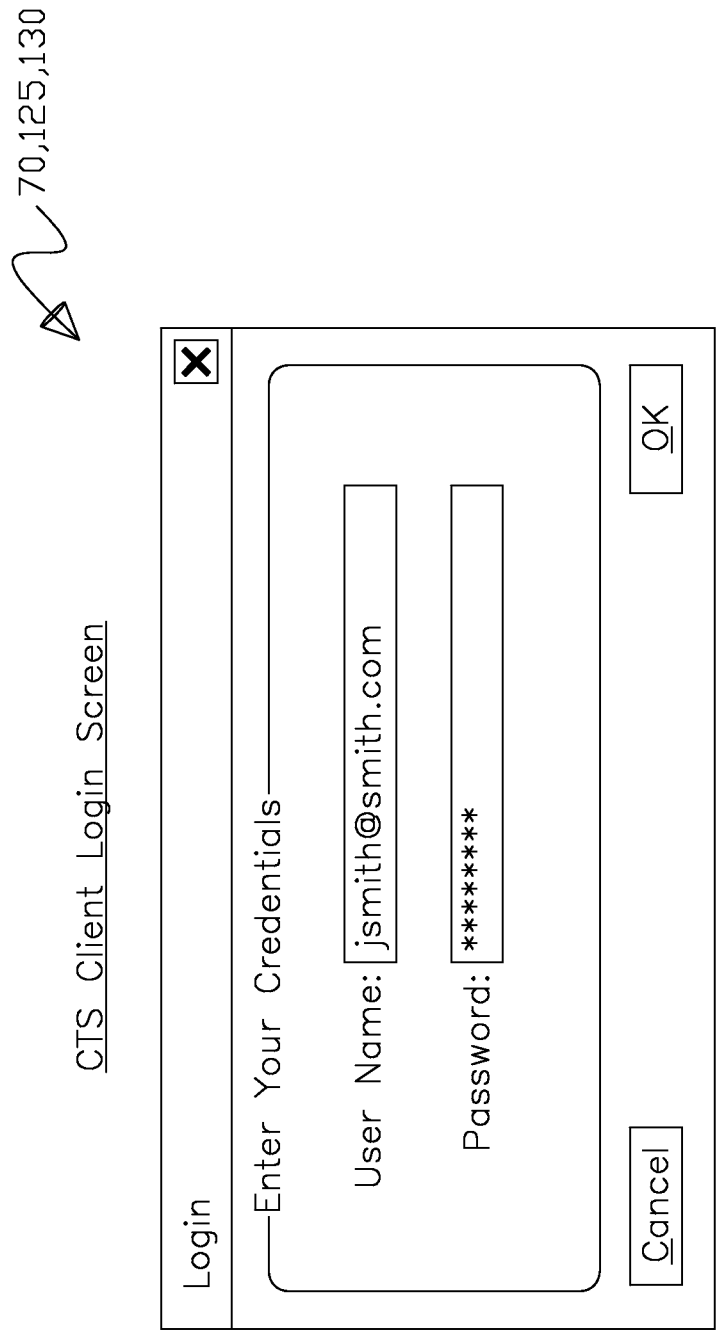
FIG. 6 shows a CTS client login screenshot wherein the client enters their credentials including their user name and password.
Figure 8:
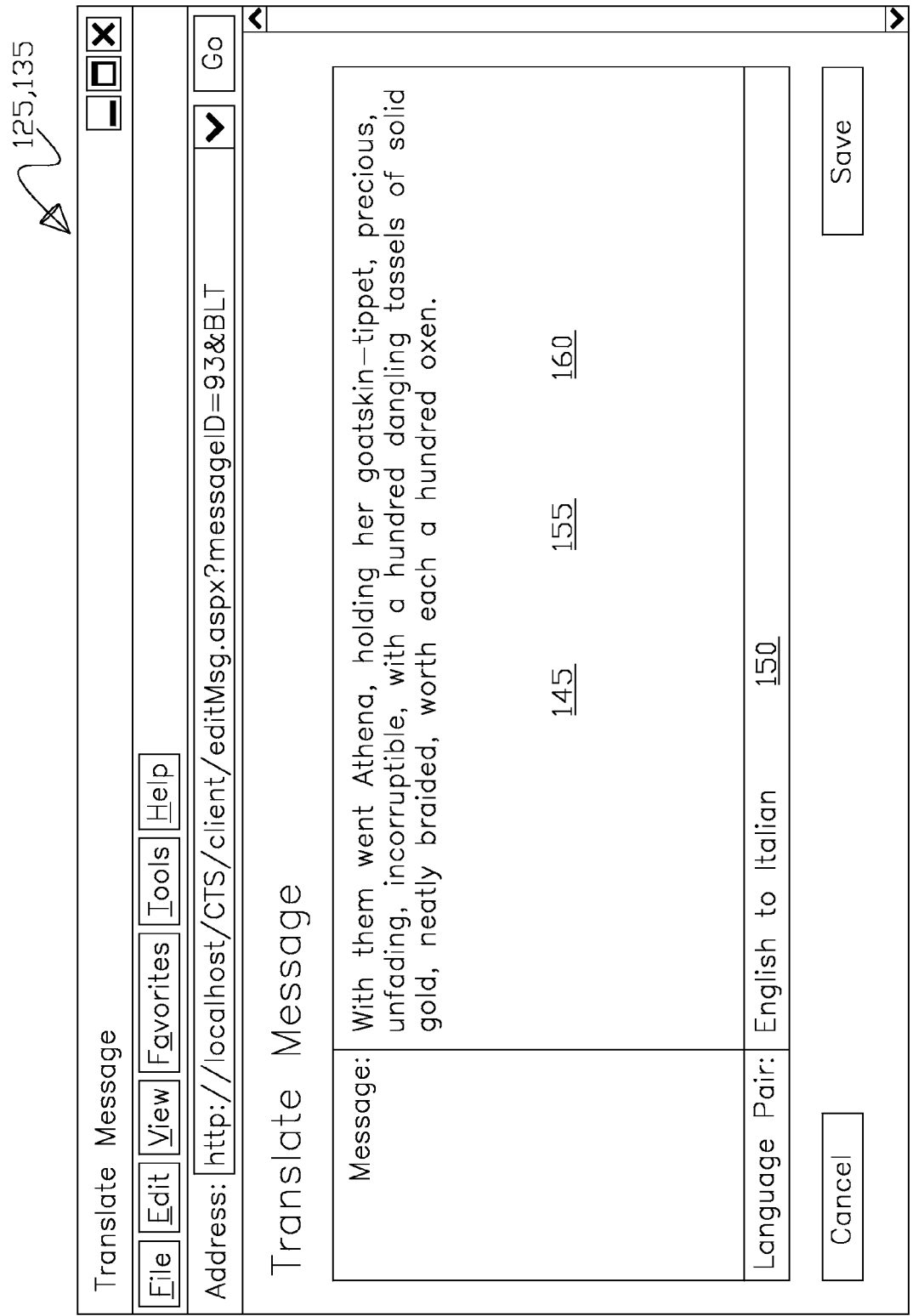
FIG. 8 shows a screenshot for the client to enter the text to be translated and the language that the text is to be translated into.

Next, FIG. 5 shows a screenshot of the CTS web translation gateway 70 which includes the service description, get message, get my messages, get service info, get service info XML, get translators, login, save system client, and submit translation options. Continuing, FIG. 6 shows a CTS client login 130 screenshot wherein the client 125 enters their credentials including their user name and password for the credentialed data portal 70. Yet further, FIG. 7 shows a CTS client 125 account information 140 screenshot that includes account property, business name, name, address, city, state, zip-code, phone, payment type, and payment info. Moving onward, FIG. 8 shows a screenshot for the client 125 to enter the text 145, 160 to be translated 135, 155 and the language 150 that the text is to be translated into.

Figure 9:
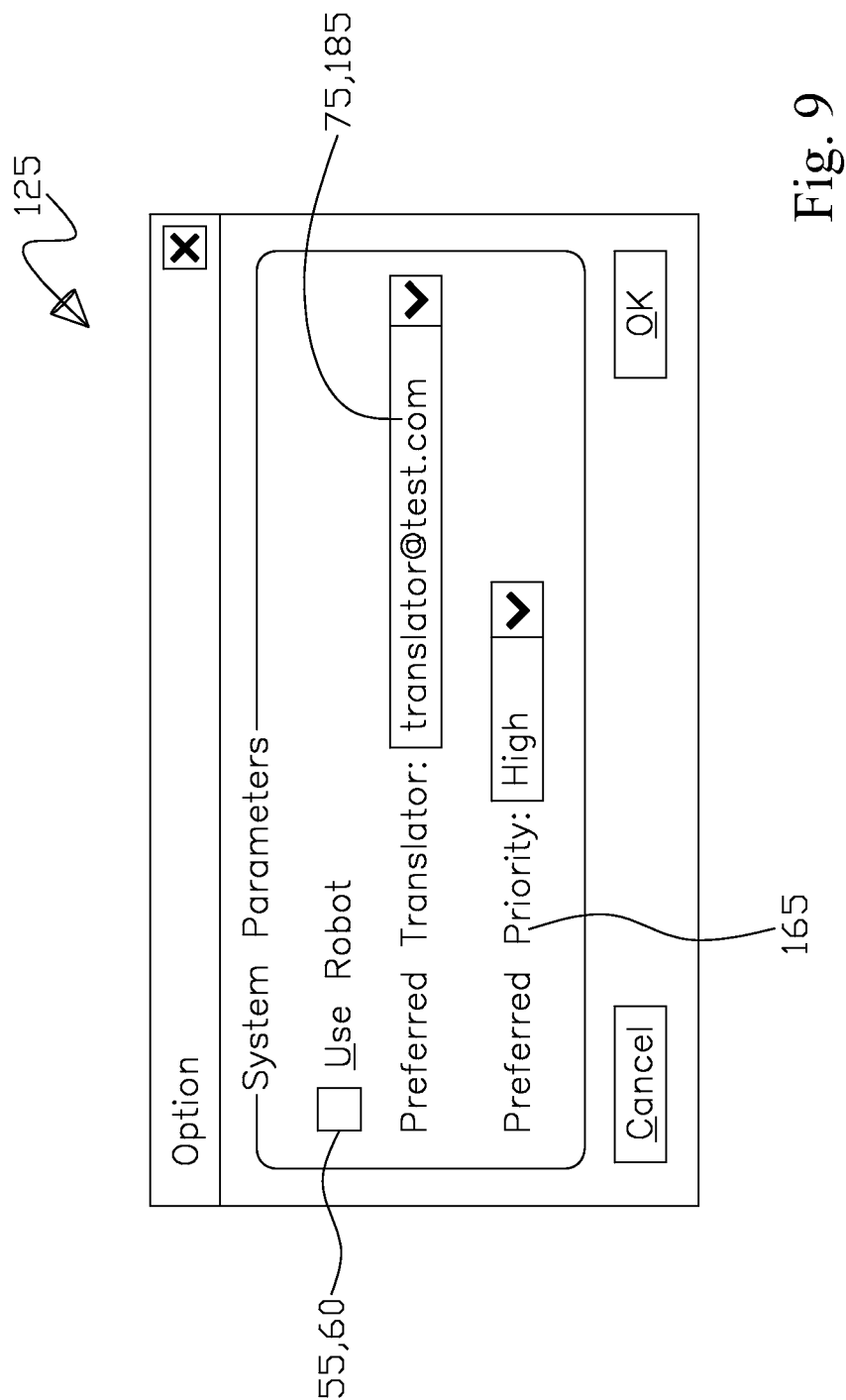
FIG. 9 shows yet another screenshot of the CTS system client interface wherein additional parameters can be set, such as whether to use the automated robot translator or not, or to request a particular live translator, and the priority to place on the translation, this just being prior to initiating the actual translation.
Figure 10:
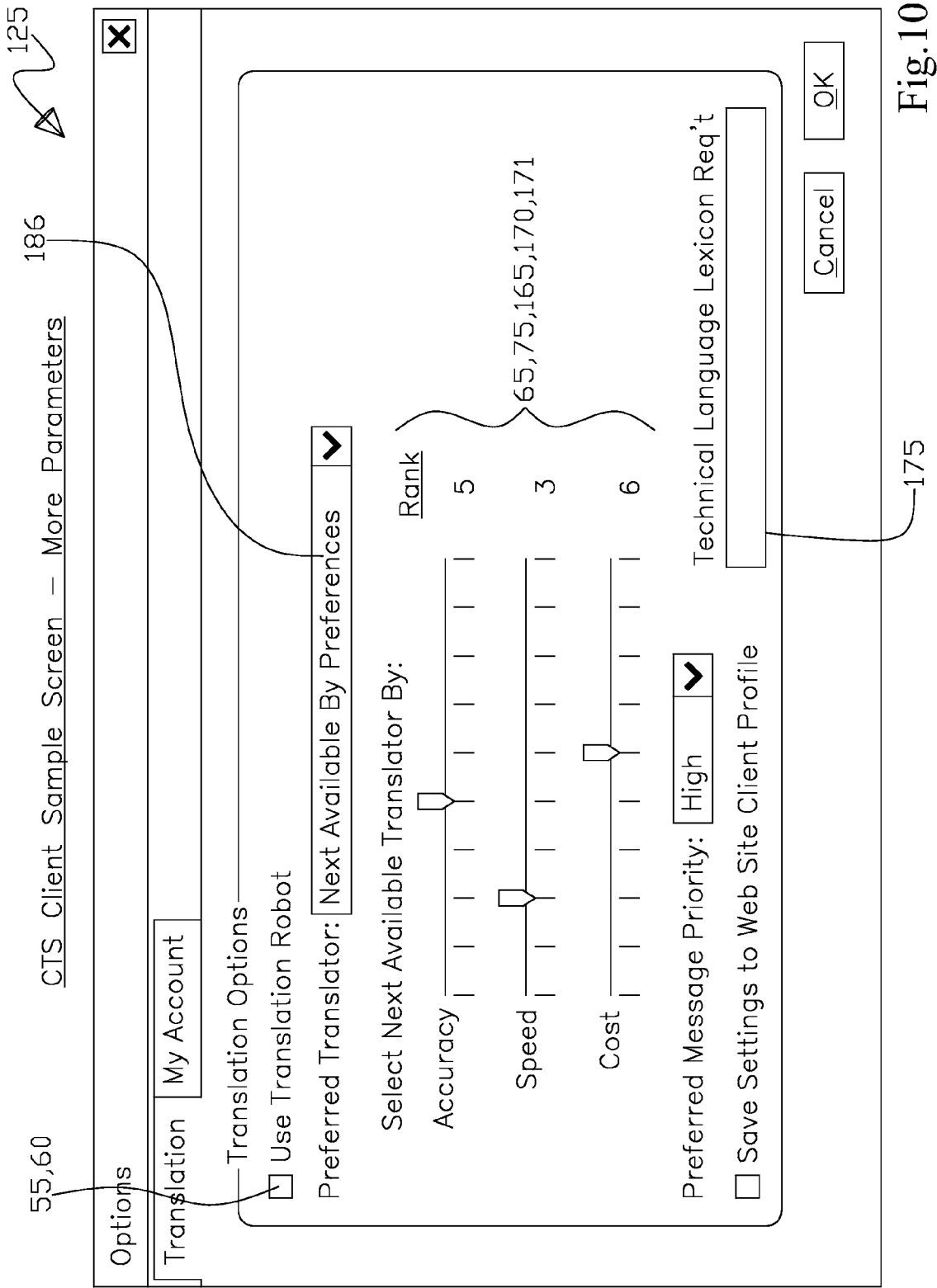
FIG. 10 shows a continuation of the CTS client sample screenshot further expanding the options available to the CTS client that include whether to use the translation robot to select a preferred translator via preferences, and the additional parameters of selecting levels of language translation accuracy, speed, and cost, the priority of the language translation job, and the technical language lexicon, along with an option to save these parameters to the client profile and a button to enter the parameters via an OK button or cancel the parameter entries.

Continuing, FIG. 9 shows yet another screenshot of the CTS system client 125 interface wherein additional parameters can be set, such as whether to use the automated robot translator 55, 60 or not, or to request a particular live translator 75, 185, and the priority 165 to place on the translation, this just being prior to initiating the actual translation. Next, FIG. 10 shows a continuation of the CTS client 125 sample screenshot further expanding the options available to the CTS client 125 that include whether to use the translation robot 55, 60, to select a preferred translator via preferences 186, and the additional parameters of selecting levels of language translation accuracy 170, speed 165, and cost 171, the priority 165 of the language translation job, and the technical language lexicon 175, along with an option to save these parameters to the client profile 140 and a button to enter the parameters via an OK button or cancel the parameter entries.

Figure 11:
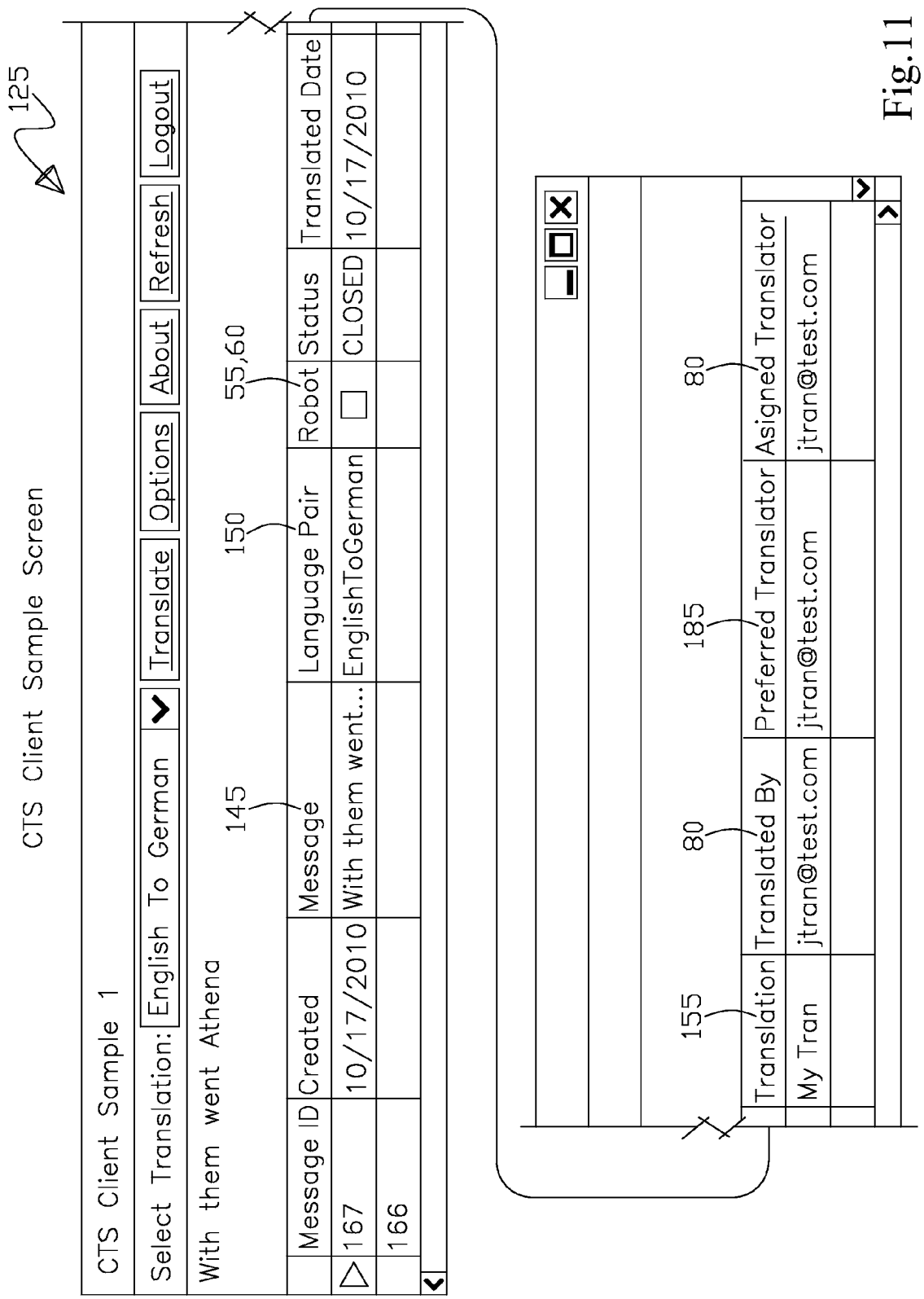
FIG. 11 shows a CTS client sample screenshot wherein the translation is selected, buttons for the function to be performed that include translate, options, about, refresh, and logout, and a box for entering the text to be translated, further a summary of translation jobs that are given a message ID, date created, a sample of the message, a language pair, robot utilization, current status, translation date, continuing with client translation ID, who translated the text, who the preferred translator was, and who the assigned translator was.
Figure 12:
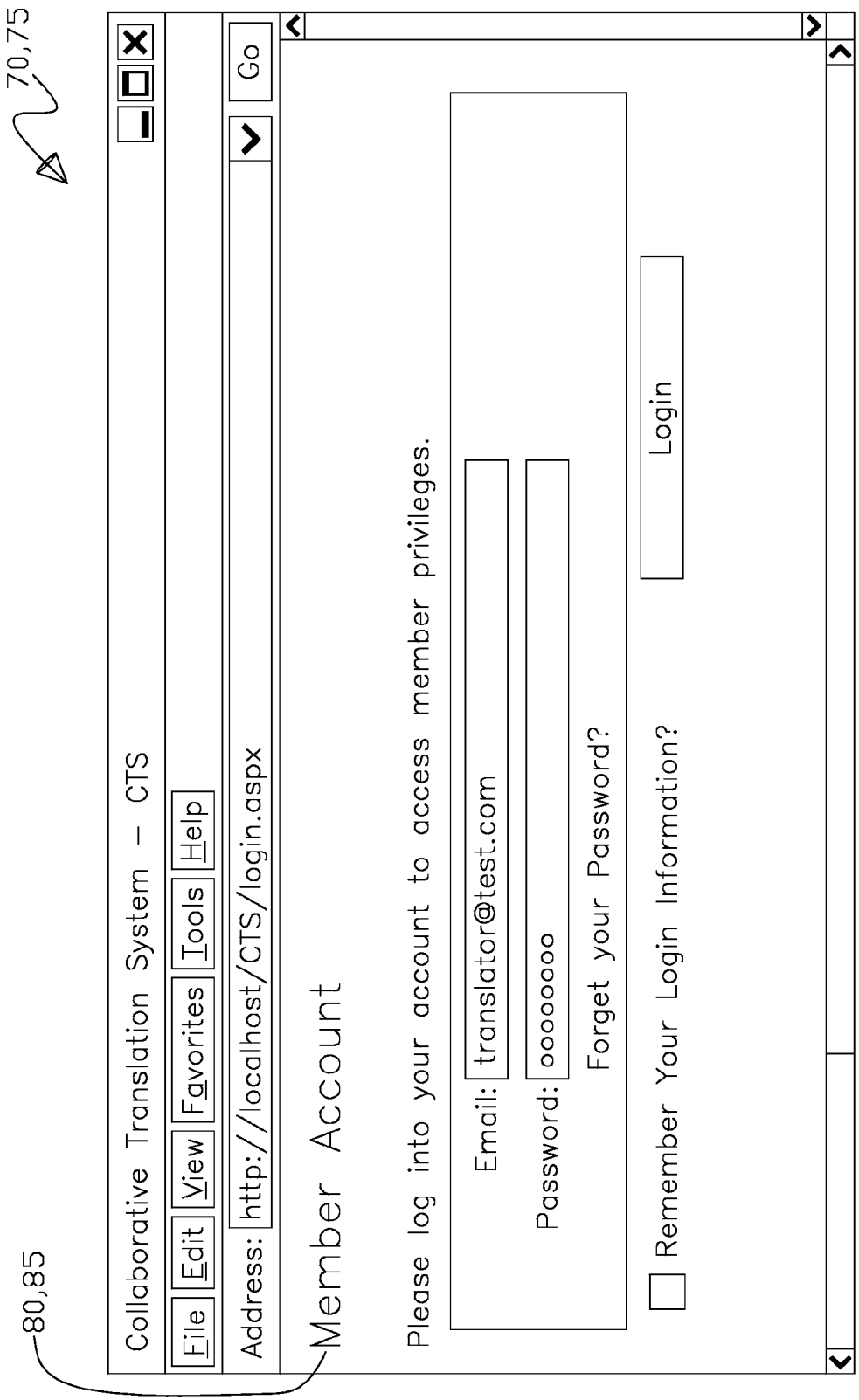
FIG. 12 shows further another screenshot of the translator or member logon into the CTS member service website.

Next, FIG. 11 shows a CTS client 125 sample screenshot showing a summary of pending and completed translation jobs, buttons for the function to be performed on the selected job that include translate, options, about, refresh, and logout, and a box for displaying the text 145 to be translated, the language to be translated into 150. Further a summary of translation jobs that are given a message ID, date created, a sample of the message 145, a language pair 150, robot 55, 60 utilization, current status, translation date, continuing with client 125 translation ID, who 80 translated the text, who the preferred 185 translator was, and who the assigned translator 80 was. Also continuing, FIG. 12 shows further another screenshot of the translator or member 80 logon into the CTS member service website 70. Further, FIG. 13 shows a screenshot of the member 80 account information 85 that includes an account summary with name 120, email, membership type, subscription information on membership, translation statistics 100, 105, 110, 115, plus credit balance, pending translations, payment history, message queue 121, member languages 95, and member payment, also the account tools of editing personal and security information, and an unsubscribe option.

Figure 14:
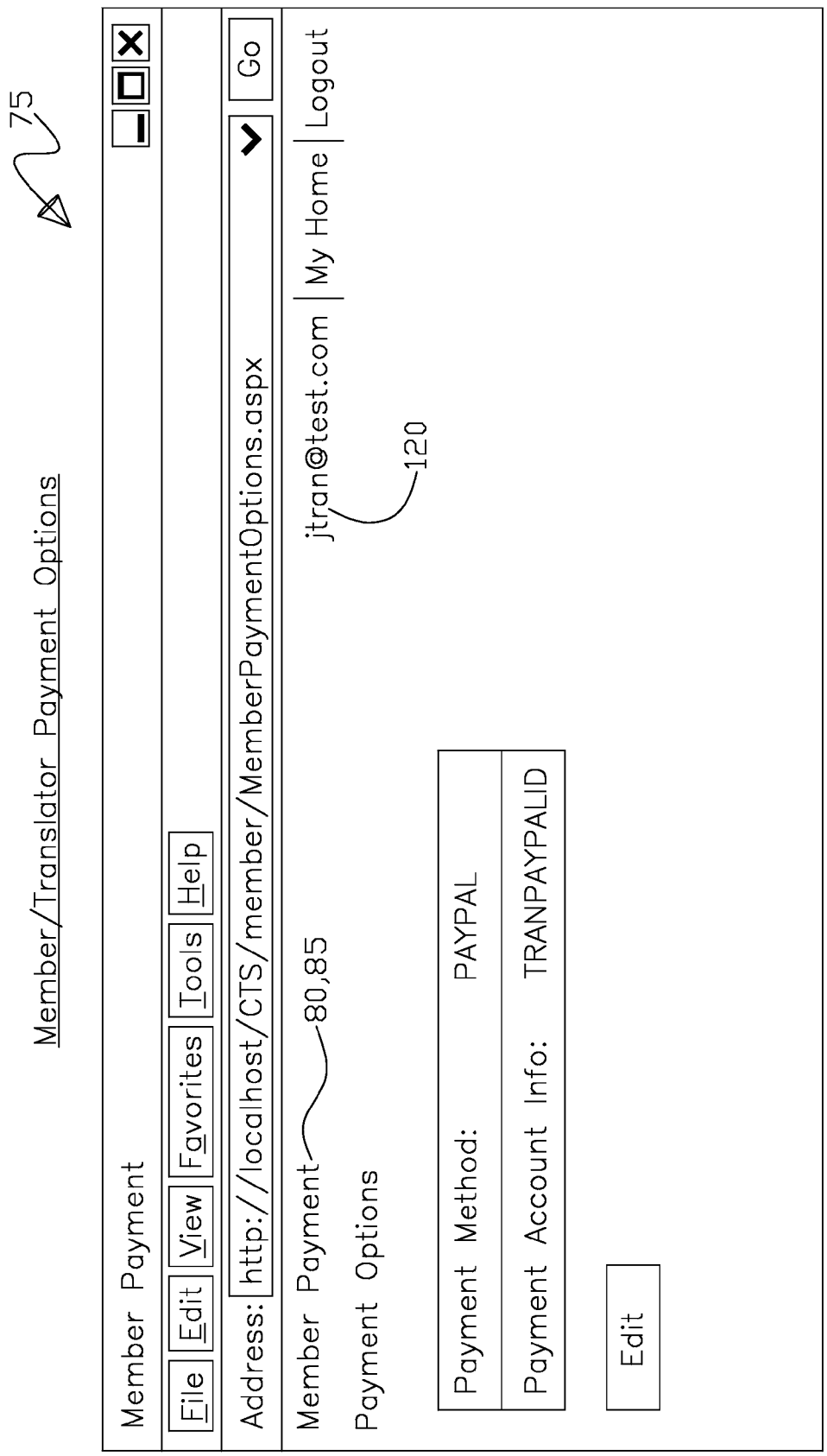
FIG. 14 shows a screenshot of the member translation job payment options page including translator ID, home, and logout, with a box specifying the payment method and the associated payment method translator info, and a payment method edit option.

Moving onward, FIG. 14 shows a screenshot of the member 80 translation job payment options page including member language translator 80 ID 120, home, and logout, with a box specifying the payment method and the associated payment method translator info, and a payment method edit option. Next, FIG. 15 shows a further subsequent screenshot after the translator or member 80 has logged in and opened their own personal queue 121 that displays their pending translation jobs, that includes information such as opening day create date, language pair translation 150, current status, a sampling of message text 145 plus a sampling of translated text 155, member ID 120, and system name. Further, FIG. 16 shows a subsequent screenshot after the translator or member 80 has logged in and opened the general queue 122 that displays all generally available pending translation jobs that the translator 80 can voluntarily pick up to do, that includes information such as opening day create date, language pair translation 150, current status, a sampling of message text 145, and system name.

Figure 17:
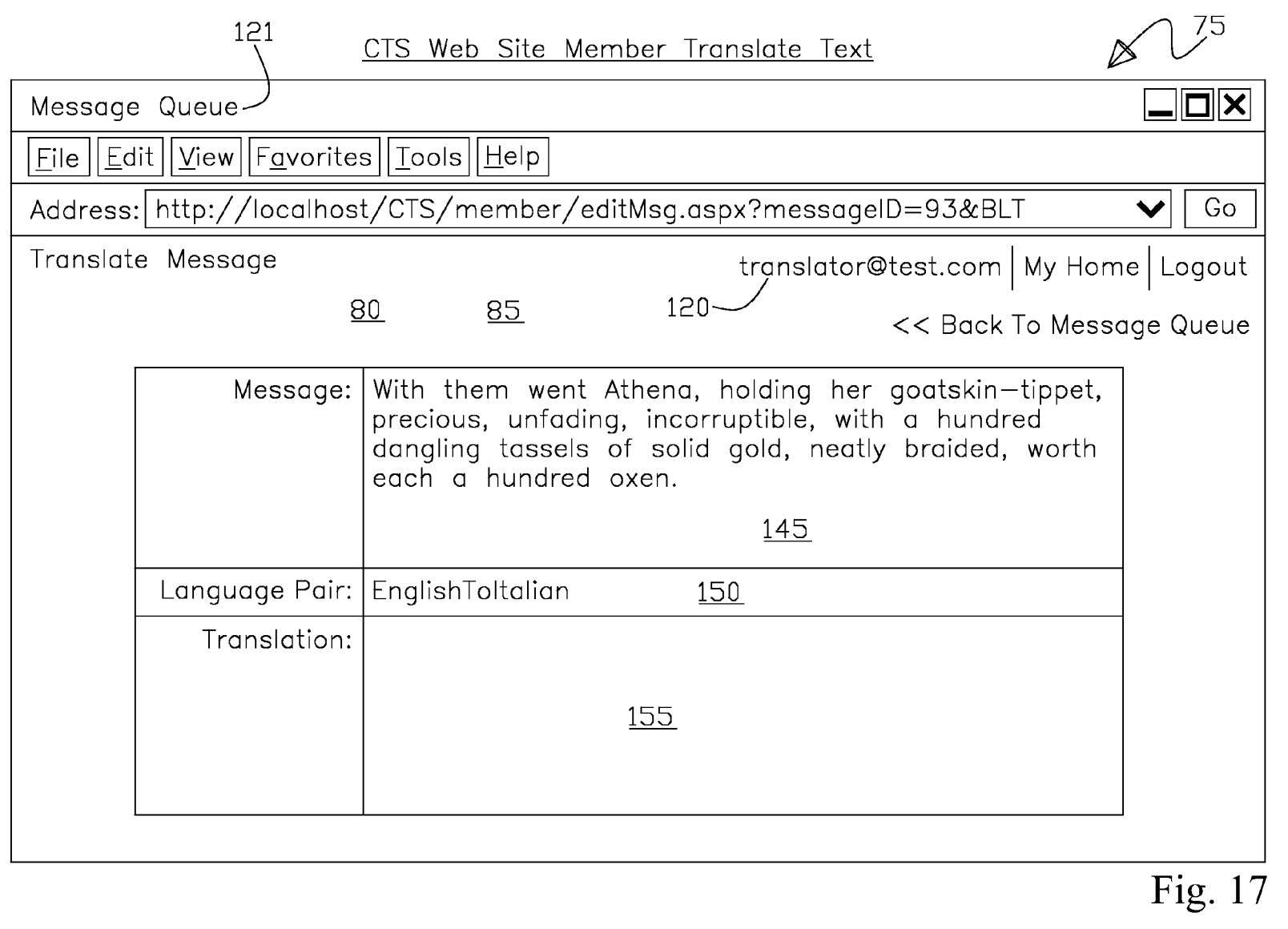

Continuing, FIG. 17 shows a screenshot of the member 80 working page including translator ID 120, home, message queue 121, and logout, with the message text 145 to be translated, the language pair desired 150, and the box for entering translated text 155. Next, FIG. 18 shows a screenshot of the member 80 translation job closed payments page including translator ID 120, home, and logout, with the paid to date balance shown, and table showing the pending and completed translation jobs that has the message ID, amount, create date, translated date, language pair 150, message text 145, system name, payment date, transaction ID, and payment type. Further, FIG. 19 shows a screenshot of the member translator 80 rankings page 180 including translator ID 120, home, and logout, with an overall ranking box including accuracy, speed, and cost, along with another box for language pair rankings that also include accuracy, speed, and cost.

Referring to FIGS. 1 through 4 for a general system overview and FIGS. 5 through 19 for specific example screenshots, a collaborative language translation system 50 is disclosed that allocates 205 as between automated 55 and manual 75 language translation services, with the collaborative language translation system 50 including a credential protected language translation data portal 70 for a manual language translator 80 to gain access to a manual language translator section 85. Further included in the system 50 is a unique database 90 associated with the manual language translator 80 in the manual language translator section 85, the unique database 90 includes information selected from the group consisting essentially of manual language translator 80 specific languages capability 95 for translation, accuracy skill level 100 for each language translated, scope of language translation project 105 desired, and language translation turn-around time 110 availability. In addition included in the system is a credential protected language translation portal 130 for a language translation client 125 to gain access to a language translation client section 135, wherein the language translation client 125 initiates a selected language translation to be completed.

Further the system 50 includes a unique information set 140 associated with the language translation client 125 in the language translation client section 135, the unique information set 140 includes information selected from the group consisting essentially of client original language text 145, client desired language 150, scope of translated material 155 which can be a total of the text 145 or special instructions from the client 125, the client desired translation formats 160, again which can be special instructions from the client 125, the client desired translation timing 165, being turnaround time for the language translation, and the client desired translation accuracy 170 that are associated with the selected language translation to be completed. Also included in the system 50 is an automated language translation system 55 database 60, one or more processors 190, a memory 195, and one or more programs 200, wherein the one or more programs 200 are stored in the memory 195 and configured to be executed by the one or more processors 190. The one or more programs 200 including instructions for allocating 205 a flow of the unique information set 140 as between the unique database 90 and the automated language translation database 60 based upon the client 125 initiated unique information set 140 associated with the selected language translation to be completed and instructions to perform the selected language translation to be completed for the language translation client 125.

Further, on the collaborative language translation system 50, the unique database 90 can further include a member translator 80 technical language lexicon expertise skill set 115 and the unique information set 140 can also further include a client 125 desired technical language lexicon expertise skill set 175. Both of the technical language lexicon expertise skill sets 115 and 175 relate to the translator having language translation skills beyond good skill and conversational language translation, in other words the language translator has knowledge in a particular science, for instance-medical terminology lexicon—that could be identified by the member translator 80 as skill 115 that would be matched to the client 125 required medical report translation, wherein the accuracy of the medical report translation would be far superior with a translator who knew the specialized lexicon for a particular scientific area.

Continuing, on the collaborative language translation system 50 the instructions to allocate 205 a flow of the unique information set 140 as between the unique database 90 and the automated language translation database 60, the unique information set will be allocated on a priority basis of firstly 210 to the automated language translation database 60 if qualified, and then secondly 215 to a manual language translator 80 specific queue 121 if qualified, and thirdly 220 to a general queue 122 for the manual language translator 80 to selectively translate. Thus to clarify, to better economize the required translation for the client 125 a search is made for the fastest and least expensive form if language translation-albeit with the most potential for poor accuracy—is the automated language translation systems 55, which can be web searched in multitudes as more and more web based translation services are coming online, such as SYSTRAN, GOOGLE-TRANSLATE, MYMOJOFITI, and the like, that have the lowest cost and fastest turnaround time depending upon if they qualify as per the clients 125 requirements that can include accuracy 170, speed 165 and cost 171, or the added qualification of technical language lexicon 175 specialty as parameters 65 for the automated translation database 60. If none of the automated language translation databases 60 qualify to the clients 125 requirements of accuracy 170, speed 165, and cost 171 and possibly the qualification of technical language lexicon 175 specialty, than a search is made for a member language translator 80 who meets the aforementioned qualifications and who would be the first available member language translator 80, wherein the clients 125 language translation job would go into the member 80 specific queue 121, if the member 80 meets the clients previously mentioned qualifications, and failing that, the clients 125 requested language translation job is placed into a general queue 122 for any member language translator 80 to pick up on a voluntary basis.

A further option for the collaborative language translation system 50 is wherein the client 125 can generate rankings of particular member language translators 80 based upon translation jobs that a particular member language translator 80 had completed for the client 125 in the categories of accuracy 170, speed 165, cost 171, and technical language lexicon expertise skill set 115, that would then be all incorporated into the unique database 94 is the particular member language translator 80 rankings. Thus these rankings by the client 125 would be analyzed to develop a ranking of the member language translators 80 performance which would be proportionally correlated to the fee that the member language translator 80 could charge for their translation services. Member language translator 80 rankings would be defined by each language pair 150 the member 80 supports. The overall ranking of the member 80 is calculated by averaging the amount of translations completed in each language pair 150 and the individual member 80 scores as determined by the client 125, see FIG. 19.

Another option for the client 125 needing a language translation job completed is the ability to specify a particular member translator 80 through their identifier 120 that is in both the unique database 90 and the unique information set 140, wherein the client 125 translation job will go directly to the particular member translators 80 specific queue 121.

Once the member language translator 80 completes the language translation either from their specific queue 121 were from the general queue 122, then the member language translator 80 submits the translated text into the CTS system 50 that is directed to the specific client 125 who requested the language translation, see FIG. 11. When the translation has been confirmed, the member language translator 80 receives a payment credit for their translation services as shown in FIG. 18, that the member language translator 80 can then withdraw their payment credit.

Further for the collaborative language translation system 50 and including all the previously described options, could be provided in the form of a computer readable storage medium having stored therein instructions, in the form of a DVD, solid state memory, or any other form of medium, wherein the computer readable storage medium which when executed by a computer from a request for a selected language translation by a language translation client, cause the computer to, access a credential protected language translation data portal 70 for a manual language translator 80 to gain access to a manual language translator section 85. Next, to access a unique database 90 associated with the manual language translator 80 in the manual language translator section 85, the unique database 90 includes information selected from the group consisting essentially of manual language translator 80 specific languages capability for translation 95, accuracy skill level for each language translated 100, scope of language translation project desired 105, and language translation turnaround time availability 110.

Further, to access a credential protected language translation portal 130 for a language translation client 125 to gain access to a language translation client section 135, wherein the language translation client 125 initiates a selected language translation to be completed. Continuing, to access a unique information set 140 associated with the language translation client 125 in the language translation client section 135, the unique information set 140 includes information selected from the group consisting essentially of client original language 145, client desired language 150, scope of translated material 155, client desired translation formats 160, client desired translation timing 165, and client desired translation accuracy 170 that are associated with the selected language translation to be completed. Further, access to an automated language translation database 60 and to allocate 205 a flow of the unique information set 140 as between the unique database 90 and the automated language translation database 60 based upon the client 125 initiated unique information set 140 associated with the selected language translation to be completed, and then to perform the selected language translation to be completed for the language translation client 125.

Method of Use

Referring to FIGS. 1 through 4 for a general system overview and FIGS. 5 through 19 for specific example screenshots, a method for collaborative language translation is disclosed that allocates as between automated 55 and manual language translation services 75, wherein the previously described options for the collaborative language translation system 50 would apply to the method of use for the collaborative language translation system. The collaborative language translation method comprising the steps of accessing a credential protected language translation data portal 70 for a manual language translator 80 to gain access to a manual language translator section 85. Next, a step of accessing a unique database 90 associated with the manual language translator 80 in the manual language translator section 85, wherein the unique database 90 includes information selected from the group consisting essentially of manual language translator 80 specific languages capability 95 for translation, accuracy skill level for each language translated 100, scope of language translation project desired 105, and language translation turnaround time availability 110.

Further, a step of accessing a credential protected language translation portal 130 for a language translation client 125 to gain access to a language translation client section 135. Thus the client 125 can login to the Web translation gateway 130 and receive authorization to use the Web translation API. The client 125 must provide credentials managed by the website 130. When the client 125 has been authenticated into the Web translation gateway 130 their account information 140 is available. Wherein the language translation client 125 initiates a selected language translation to be completed. Subsequent to this, a step of accessing a unique information set 140 associated with the language translation client 125 in the language translation client section 135, the unique information set 140 includes information selected from the group consisting essentially of client original language 145, client desired language 150, scope of translated material 155, client desired translation formats 160, client desired translation timing 165, and client desired translation accuracy 170 that are associated with the selected language translation to be completed, wherein the language translation is submitted by the client 125. Also the client 125 has available for viewing all previous language translation jobs that have been entered into the CTS system 50. Following a step of accessing an automated language translation database 60 and allocating 205 a flow of the unique information set 140 as between the unique database 90 and the automated language translation database 60 based upon the client 125 initiated unique information set 140 associated with the selected language translation to be completed and a step of performing the selected language translation to be completed for the language translation client 125.

Incorporation by reference to the specification for the source code as follows:
Source code—concurrently submitted as an ASCII text file;
File name: CTSDEV_2010_10_17_ALL_ASCII_FILES
File size (MB): 6.95
File creation date: Oct. 18, 2010
File format: WinZip File (.ZIP) (no password required)
File description: Source code for the complete code of the collaborative language translation system 50, computer readable storage medium, and method concerning the web language translation gateway web service.

CONCLUSION

Accordingly, the present invention of a collaborative language translation system, computer readable storage medium, and method of using the same has been described with some degree of particularity directed to the embodiments of the present invention. It should be appreciated, though, that the present invention is defined by the following claims construed in light of the prior art so modifications or changes may be made to the exemplary embodiments of the present invention without departing from the inventive concepts contained therein.

The invention claimed is:

1. A collaborative language translation system that allocates as between automated and manual language translation services, said collaborative language translation system comprising:
  (a) a credential protected language translation data portal for a manual language translator to gain access to a manual language translator section;
  (b) a unique database associated with the manual language translator in said manual language translator section, said unique database includes information selected from the group consisting of manual language translator specific languages capability for translation, accuracy skill level for each language translated, a technical scientific language lexicon expertise skill set based upon the manual language translator's specific science background, confidentiality capabilities, scope of language translation project required, and language translation turnaround time availability forming a unique database criteria;
  (c) a credential protected language translation portal for a language translation client to gain access to a language translation client section, wherein the language translation client initiates a selected language translation to be completed;
  (d) a unique information set associated with the language translation client in said language translation client section, said unique information set includes a client original language, a client required language, a client required confidentiality level, a client required scope of translated material, a client required translation format, and a plurality of selectable sliding bar scales all within a single display panel for the language translation client to select information to specify the language translation needs of the client, each of said plurality of selectable sliding bar scales are associated with a client selected language translation accuracy from low to high, a client selected language translation speed from low to high, a client selected language translation cost from low to high, and a client selected language translation technical lexicon that are all associated with said selected language translation to be completed, wherein said unique information set forming a unique information set criteria is stored for the language translation client and said unique information set is retrievable for the language translation client for said unique information set criteria of the language translation needs of the client for future language translations;
  (e) an automated language translation database including an automated language translation database criteria of accuracy, speed, cost, and scientific technical language lexicon;
  (f) one or more processors;
  (g) memory;
  (h) one or more programs, wherein said one or more programs are stored in said memory and configured to be executed by said one or more processors, said one or more programs including:
    (h)(i) instructions for allocating a flow of said unique information set criteria as between said unique database criteria and said automated language translation database criteria based upon the client initiated said unique information set criteria associated with said selected language translation to be completed; and (h)(ii) instructions to perform said selected language translation to be completed for the language translation client.

2. A collaborative language translation system according to claim 1 wherein said instructions to allocate a flow of said unique information set as between said unique database and said automated language translation database, said unique information set will be allocated;
   - (3)(i) firstly to said automated language translation database if said unique information set criteria and said automated language translation database criteria are satisfied relative to one another;
   - (3)(ii) secondly to a manual language translator specific queue if said unique information set criteria and said unique database criteria are satisfied relative to one another; and
   - (3)(iii) thirdly to a general queue for the manual language translator to selectively translate.

3. A collaborative language translation system according to claim 2 wherein said manual language translator unique database criteria is based on a client generated ranking with categories of accuracy, speed, cost, and technical scientific language lexicon expertise skill set based upon the manual language translator's specific science background, that are all incorporated into said unique database criteria.

4. A collaborative language translation system according to claim 1 wherein said unique database criteria further includes a specific manual language translator identifier and said unique information set criteria further includes a client required specific manual language translator identifier.

5. A collaborative language translation system according to claim 4 wherein said instructions to allocate a flow of said unique information set criteria as between said unique database criteria and said automated language translation database criteria, said unique information set criteria will be allocated to said client required specific manual language translator.

6. A non-transitory computer readable storage medium having stored therein instructions, which when executed by a computer from a request for a selected language translation by a language translation client, cause the computer to:
   - (a) access a credential protected language translation data portal for a manual language translator to gain access to a manual language translator section;
   - (b) access a unique database associated with the manual language translator in said manual language translator section, said unique database includes information selected from the group consisting of manual language translator specific languages capability for translation, accuracy skill level for each language translated, a technical scientific language lexicon expertise skill set based upon the manual language translator's specific science background, confidentiality capabilities, scope of language translation project required, and language translation turnaround time availability forming a unique database criteria;
   - (c) access a credential protected language translation portal for a language translation client to gain access to a language translation client section, wherein the language translation client initiates a selected language translation to be completed;
   - (d) access a unique information set associated with the language translation client in said language translation client section, said unique information set includes a client original language, a client required language, a client required confidentiality level, a client required scope of translated material, a client required translation format, and a plurality of selectable sliding bar scales all within a single display panel for the language translation client to select information to specify the language translation needs of the client, each of said plurality of selectable sliding bar scales are associated with a client selected language translation accuracy from low to high, a client selected language translation speed from low to high, a client selected language translation cost from low to high, and a client selected language translation technical lexicon that are all associated with said selected language translation to be completed, wherein said unique information set forming a unique information set criteria is stored for the language translation client and said unique information set criteria is retrievable for the language translation client to meet the language translation needs of the client for future language translations;
   - (e) access an automated language translation database including an automated language translation database criteria of accuracy, speed, cost, and scientific technical language lexicon;
   - (f) allocate a flow of said unique information set criteria as between said unique database criteria and said automated language translation database criteria based upon the client initiated said unique information set criteria associated with said selected language translation to be completed; and
   - (g) perform said selected language translation to be completed for the language translation client.

7. A non-transitory computer readable storage medium according to claim 6 wherein said allocate a flow of said unique information set as between said unique database and said automated language translation database, said unique information set will be allocated;
   - (10) (i) firstly to said automated language translation database if said unique information set criteria and said automated language translation database criteria are satisfied relative to one another;
   - (10) (ii) secondly to a manual language translator specific queue if said unique information set criteria and said unique database criteria are satisfied relative to one another; and
   - (10) (iii) thirdly to a general queue for the manual language translator to selectively translate.

8. A non-transitory computer readable storage medium according to claim 7 wherein said manual language translator unique database criteria is based on a client generated ranking with categories of accuracy, speed, cost, and technical scientific language lexicon expertise skill set based upon the manual language translator's specific science background, that are all incorporated into said unique database.

9. A non-transitory computer readable storage medium according to claim 6 wherein said unique database criteria further includes a specific manual language translator identifier and said unique information set criteria further includes a client required specific manual language translator identifier.

10. A non-transitory computer readable storage medium according to claim 9 wherein said allocate a flow of said unique information set criteria as between said unique database criteria and said automated language translation database criteria, said unique information set criteria will be allocated to said client required specific manual language translator.

11. A method for collaborative language translation that allocates as between automated and manual language translation services, said collaborative language translation method comprising the steps of:

(a) accessing a credential protected language translation data portal for a manual language translator to gain access to a manual language translator section;
(b) accessing a unique database associated with the manual language translator in said manual language translator section, said unique database includes information selected from the group consisting of manual language translator specific languages capability for translation, accuracy skill level for each language translated, a technical scientific language lexicon expertise skill set based upon the manual language translator's specific science background, confidentiality capabilities, scope of language translation project required, and language translation turnaround time availability forming a unique database criteria;
(c) accessing a credential protected language translation portal for a language translation client to gain access to a language translation client section, wherein the language translation client initiates a selected language translation to be completed;
(d) accessing a unique information set associated with the language translation client in said language translation client section, said unique information set includes a client original language, a client required language, a client required confidentiality level, a client required scope of translated material, a client required translation format, and a plurality of selectable sliding bar scales all within a single display panel for the language translation client to select information to specify the language translation needs of the client, each of said plurality of selectable sliding bar scales are associated with a client selected language translation accuracy from low to high, a client selected language translation speed from low to high, a client selected language translation cost from low to high, and a client selected language translation technical lexicon that are all associated with said selected language translation to be completed, wherein said unique information set forms a unique information set criteria is stored for the language translation client and said unique information set criteria is retrievable for the language translation client to meet the language translation needs of the client for future language translations;
(e) accessing an automated language translation database including an automated language translation database criteria of accuracy, speed, cost, and scientific technical language lexicon;
(f) allocating a flow of said unique information set criteria as between said unique database criteria and said automated language translation database criteria based upon the client initiated said unique information set criteria associated with said selected language translation to be completed; and
(g) performing said selected language translation to be completed for the language translation client.

12. A method for collaborative language translation according to claim 11 wherein said step of allocating a flow of said unique information set as between said unique database and said automated language translation database, said unique information set will be allocated;
(17) (i) firstly to said automated language translation database if said unique information set criteria and said automated language translation database criteria are satisfied relative to one another;
(17) (ii) secondly to a manual language translator specific queue if said unique information set criteria and said unique database criteria are satisfied relative to one another; and
(17) (iii) thirdly to a general queue for the manual language translator to selectively translate.

13. A method for collaborative language translation according to claim 12 wherein said manual language translator unique database criteria is based on a client generated ranking with categories of accuracy, speed, cost, and technical scientific language lexicon expertise skill set based upon the manual language translator's specific science background, that are all incorporated into said unique database.

14. A method for collaborative language translation according to claim 11 wherein said unique database criteria further includes a specific manual language translator identifier and said unique information set criteria further includes a client required specific manual language translator identifier.

15. A method for collaborative language translation according to claim 14 wherein said step of allocating a flow of said unique information set criteria as between said unique database criteria and said automated language translation database criteria, said unique information set criteria will be allocated to said client required specific manual language translator.

* * * * *